United States Patent
Uchikawa et al.

(10) Patent No.: US 6,595,272 B1
(45) Date of Patent: Jul. 22, 2003

(54) DOUBLE HEAT EXCHANGER HAVING CONDENSER CORE AND RADIATOR CORE

(75) Inventors: Akira Uchikawa, Nagoya (JP); Norihisa Sasano, Ama-gun (JP); Satomi Muto, Nishikasugai-gun (JP); Takaaki Sakane, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/667,165

(22) Filed: Sep. 21, 2000

(30) Foreign Application Priority Data

Sep. 30, 1999 (JP) .......................... 11-279972

(51) Int. Cl.[7] .............................. F28F 19/06
(52) U.S. Cl. ................... 165/134.1; 165/175; 165/153; 29/890.03
(58) Field of Search .................... 165/41, 67, 144, 165/135, 140, 175, 176, 173, 153, 150, 134.1, 76, 78, 133; 29/890.03, 890.043

(56) References Cited

U.S. PATENT DOCUMENTS

| | | | |
|---|---|---|---|
| 5,377,901 A | * | 1/1995 | Rungta et al. |
| 5,762,132 A | * | 6/1998 | Evans et al. |
| 5,868,196 A | * | 2/1999 | Tanaka ......................... 165/67 |
| 6,267,174 B1 | * | 7/2001 | Ozaki et al. ................. 165/140 |
| 6,305,465 B1 | * | 10/2001 | Uchikawa et al. .......... 165/140 |
| 6,374,632 B1 | * | 4/2002 | Nobuta et al. .......... 165/173 X |

FOREIGN PATENT DOCUMENTS

JP    A-10-103893    4/1998

OTHER PUBLICATIONS

Publication No. 10–103893, Patent Abstracts of Japan, Apr. 24, 1998.*

* cited by examiner

*Primary Examiner*—Ljiljana Ciric
(74) *Attorney, Agent, or Firm*—Harness, Dickey & Pierce, PLC (57) ABSTRACT

In a double heat exchanger having a condenser core and a radiator core, a protrusion is provided on a condenser header tank which contacts a radiator header tank so that a clearance between the condenser header tank and the radiator header tank around the protrusion is in a range of 0.5 mm–1.5 mm. Further, a coating-removing restriction material such as magnesium for restricting the removal of an oxidation coating formed on the surface of a brazing material is added to one of the contact areas of the protrusion and the contact area of the condenser header tank. Thus, it can prevent brazing material from being collected in the contact areas of the protrusion and the condenser header tank by a capillary phenomenon during brazing. Accordingly, the heat-transmitting area between the radiator header tank and the condenser header tank is not increased, and the heat-radiating capacity of the condenser core is increased.

15 Claims, 6 Drawing Sheets

DOUBLE HEAT EXCHANGER HAVING CONDENSER CORE AND RADIATOR CORE

CROSS-REFERENCE TO RELATED APPLICATION

This application is related to and claims priority from Japanese Patent Applications No. Hei. 11-279972 filed on Sep. 30 1999, the contents of which are hereby incorporated by reference.

BACKGROUND OF THE INVENTION

1. Field of the Invention

The present invention relates to a double heat exchanger having several core portions such as a condenser core for a vehicle refrigerant cycle and a radiator core for a vehicle engine.

2. Description of Related Art

In a conventional double heat exchanger described in JP-A-10-103893, plural protrusion portions are provided in a radiator header tank to partially contact a condenser header tank. However, during brazing, melted brazing material flows from the protrusion portion of the radiator header tank to a contact portion between the protrusion portion and the condenser header tank to be collected at the contact portion by a capillary phenomenon. Therefore, after the brazing, the contact area between the protrusion portion and the condenser header tank increases. Accordingly, the heat of the cooling water in the radiator is transmitted to refrigerant in the condenser, and the heat-radiating capacity of the condenser is decreased.

SUMMARY OF THE INVENTION

In view of the foregoing problems, it is an object of the present invention to provide a double heat exchanger having first and second cores which prevents a decrease of the heat-radiating capacity due to the heat transmission between the first and second cores.

According to the present invention, in a double heat exchanger with a first core and a second core, a protrusion is provided on a first header tank communicating with plural first tubes of the first core. The protrusion has a contact part contacting a contact surface of a second header tank communicating with plural second tubes of the second core. In the double heat exchanger, a coating-removing restriction material for restricting the removal of an oxidation coating formed on the surface of a brazing material is added to either the contact part of the protrusion or the con tact surface of the second header tank. Therefore, it can prevent the melted, brazing material from flowing from the protrusion to the contact surface of the second header tank due to a capillary phenomenon during brazing. Accordingly, a heat-transmitting area between the first header tank and the second header tank is not increased, and a decrease of heat-radiating capacity of the double heat exchanger due to heat-transmission between both first and second header tanks can be restricted.

Preferably, the coating-removing restriction material is magnesium. Therefore, it is possible for either the contact part of the protrusion or the contact surface of the second header tank to be made of an aluminum alloy including magnesium. Alternatively, on either the contact part of the protrusion or the contact surface of the second header tank, a paste-like magnesium material can be added as the coating-removing restriction material. Accordingly, the moving of the melted brazing; material due to the capillary phenomenon can be restricted.

More preferably, the protrusion is provided by a bracket attached to the first header tank, and the bracket is formed separately from the first and second header tanks. Therefore, are protrusion can be easily formed.

Further, the protrusion is disposed to form a clearance around the protrusion between the first header tank and the second header tank, and the clearance is set to a range of 0.5 mm–1.5 mm. Therefore, it can further restrict melted brazing material from collecting between the protrusion and the contact part contacting the second header tank by the capillary phenomenon during brazing. Accordingly, a decrease of heat-radiating capacity due to the heat transmission between the first and second cores can be further restricted.

BRIEF DESCRIPTION.OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

A first preferred embodiment of the present invention will be now described with reference to FIGS. 1–6. In the first embodiment, the present invention is typically applied to a double heat exchanger 100 in which a condenser 110 of a vehicle refrigerant cycle and a radiator 120 for cooling engine-cooling water are integrated. Refrigerant circulating in the refrigerant cycle is heat-exchanged with air in the condenser 110, to be cooled. The condenser 110 includes plural condenser tubes 111 mad e of an aluminum material (e.g., aluminum 3003), plural condenser fins 112 each of which is made of an aluminum material (e.g., aluminum 3003) and is disposed between adjacent condenser tubes 111 to facilitate a heat exchange between refrigerant and air, and condenser header tanks 113 and 114 which are made of an aluminum material (e.g., aluminum 3003) and are, disposed at both longitudinal ends of each condenser tube 111 to communicate with the condenser tubes 111. A condenser core 110a is composed of the plural condenser tubes 111 and the plural condenser fins 112.

Figure 1:
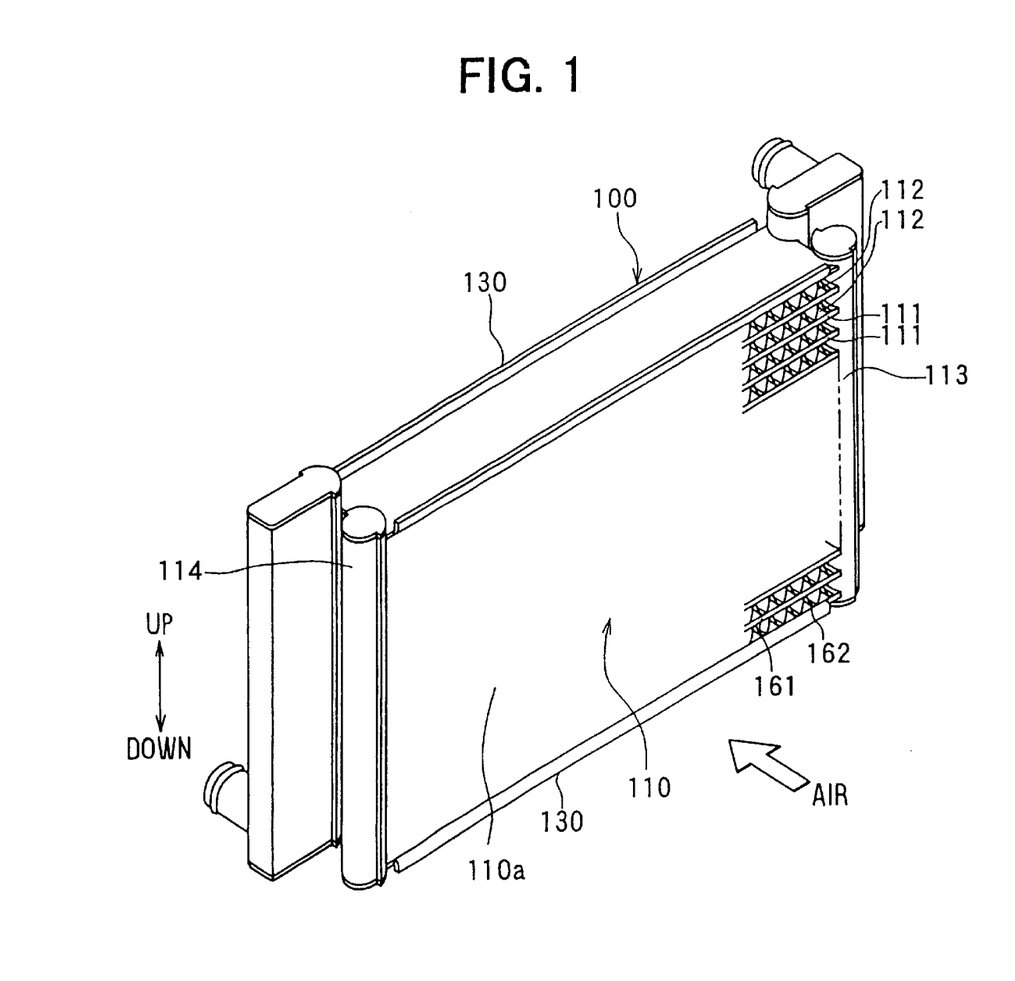
FIG. 1 is a perspective view of a double heat exchanger when being viewed from an upstream air side, according to a first preferred embodiment of the present invention.
Figure 3:
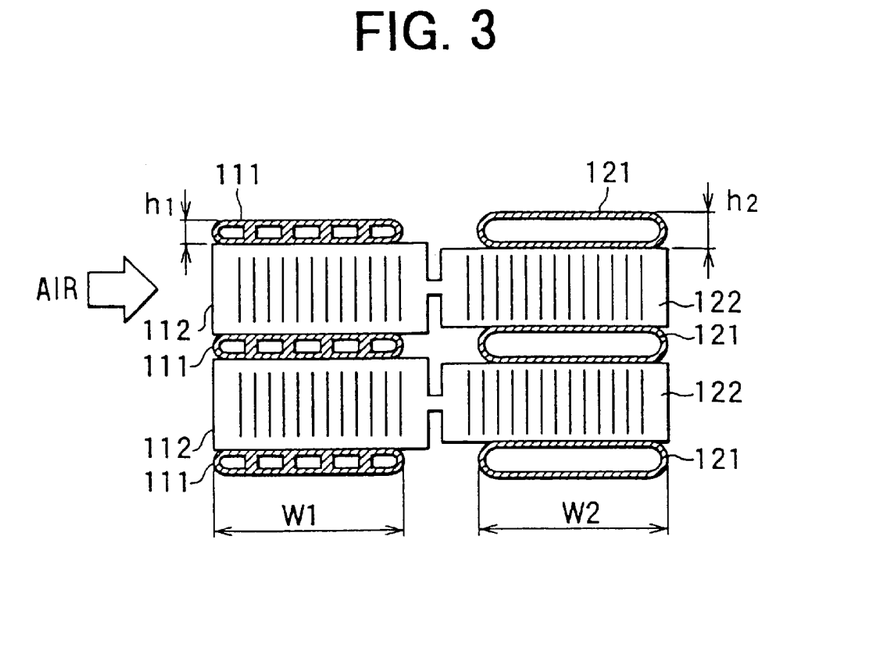
FIG. 3 is a schematic sectional view of the double heat exchanger according to the first embodiment.

The condenser header tank 113 disposed at a right side in FIG. 1 is for supplying refrigerant into the plural condenser tubes 111, and the condenser header tank 114 disposed at a left side in FIG. 1 is for collecting and receiving refrigerant having been heat-exchanged in the condenser tubes 111. Each condenser tube 111, having therein plural refrigerant passages 111a as shown in FIG. 3, is formed into a flat shape by extrusion or drawing. As shown in FIG. 3, the condenser fins 112 are integrated with radiator fins 122 described later.

Figure 2:
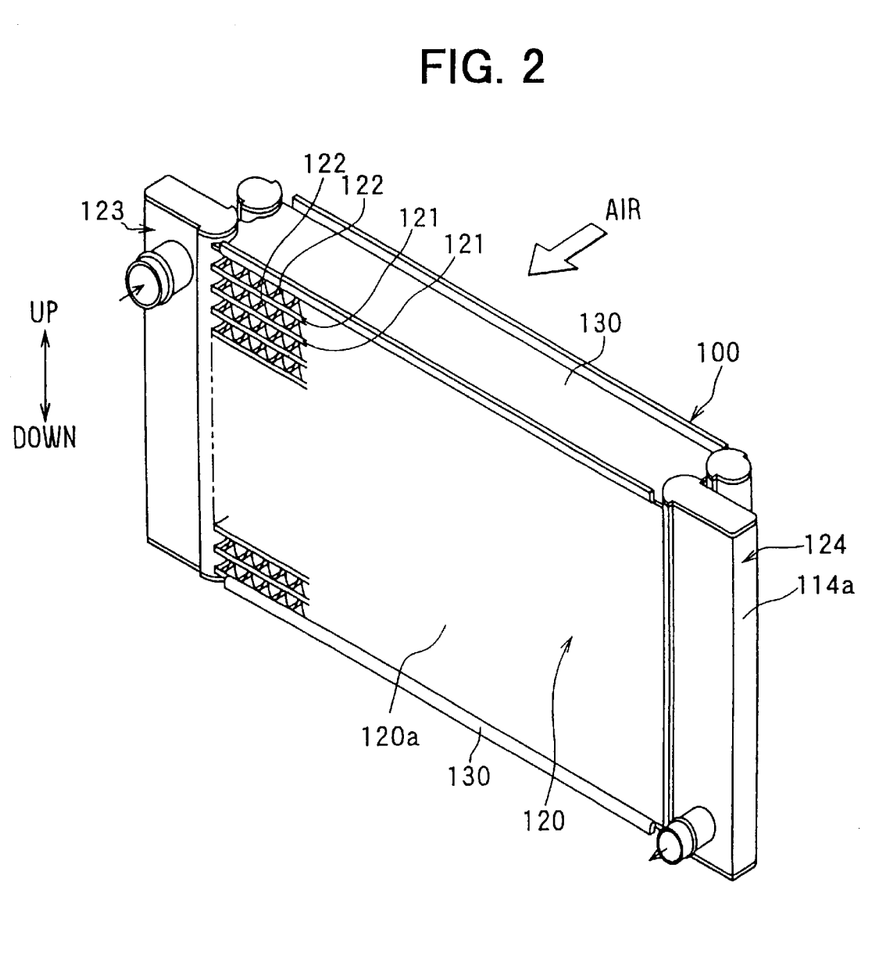
FIG. 2 is a perspective view of the double heat exchanger when being viewed from a downstream air side, according to the first embodiment.

On the other hand, in a radiator 120 shown in FIG. 2, cooling water from a vehicle engine is heat-exchanged with air to be cooled. The radiator 120 includes plural radiator tubes 121 made of an aluminum material (e.g., aluminum 3003), the plural radiator fins 122 each of which is made of an aluminum material (e.g., aluminum 3003) and is disposed between adjacent radiator tubes 121 to facilitate a heat exchange between cooling water and air, and radiator header tanks 123 and 124 which are made of an aluminum material (e.g., aluminum, 3003) and are disposed at both ends of each radiator tube 121 to communicate with the radiator tubes 121. A radiator core 120a is composed of the plural radiator tubes 121 and the plural radiator fins 122.

The radiator header tank 123 disposed at a left side in FIG. 2 is for supplying and distributing cooling water into the plural radiator tubes 121, and the radiator header tank 124 disposed at a right side in FIG. 2 is for collecting and receiving cooling water having been heat-exchanged with air in the radiator tubes 121.

In the first embodiment, each of the radiator tubes 121 is formed into a simple flat shape as shown in FIG. 3. A minor-diameter dimension (i.e., thickness) h2 of each radiator tube 121 is made larger than a minor-diameter dimension (i.e., thickness) h1 of each condenser tube 111. Further, a major-diameter dimension W1 (i.e., width) of each condenser tube 111 is approximately equal to a major-diameter dimension W2 (i.e., width) of each radiator tube 121. In the double heat exchanger 100, a flow direction of air passing through the condenser 110 and the radiator 120 is in the major diameter direction of the tubes 111, 121.

Refrigerant flows through the condenser tubes 111 while a phase change from gas phase refrigerant to liquid phase refrigerant is generated. On the other hand, cooling water for cooling the vehicle engine flows through the radiator tubes 121 without a phase change. Therefore, in the first embodiment of the present invention, each sectional passage area of the radiator tubes 121 is set larger than that of the condenser tubes 111.

Both side plates 130 for reinforcing the condenser core 110a and the radiator core 120a are disposed at both ends of the condenser core 110a and the radiator core 120a to contact the condenser fins 112 at both ends and the radiator fins 122 at both ends. In the first embodiment, the tubes 111, 121, the fins 112, 122, the header tanks 113, 114, 123, 124 and the side plates 130 are integrally bonded by a brazing method (NB method) using a brazing material (e.g., brazing material 4045) coated on the surfaces-thereof. In this brazing method (NB method), after a flux for removing an oxidation coating is applied to an aluminum member coated with a brazing material, the aluminum member is heat-brazed under an inert gas such as nitrogen.

Figure 4:
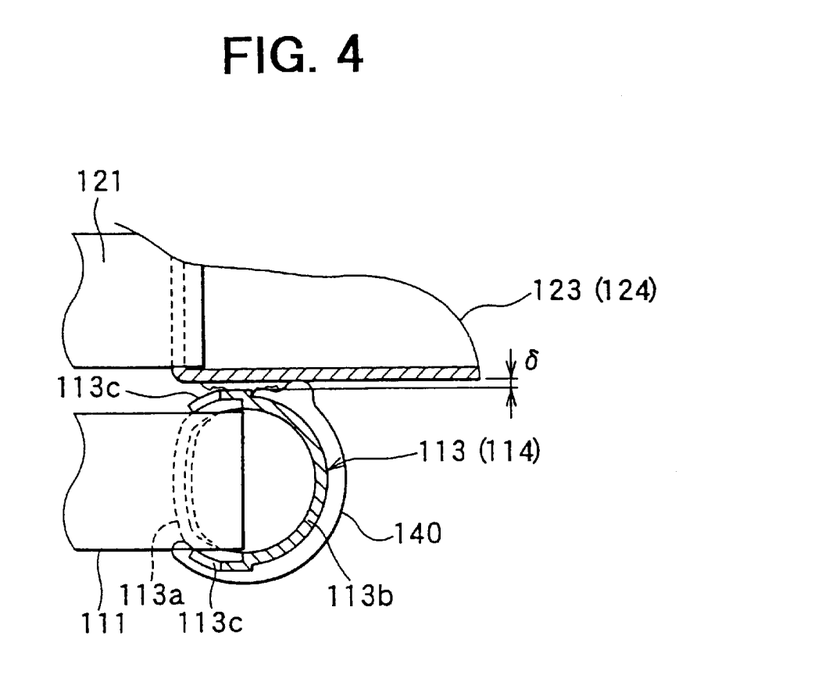
FIG. 4 is a sectional view showing a part of header tanks of the double heat exchanger according to the first embodiment.
Figure 5:
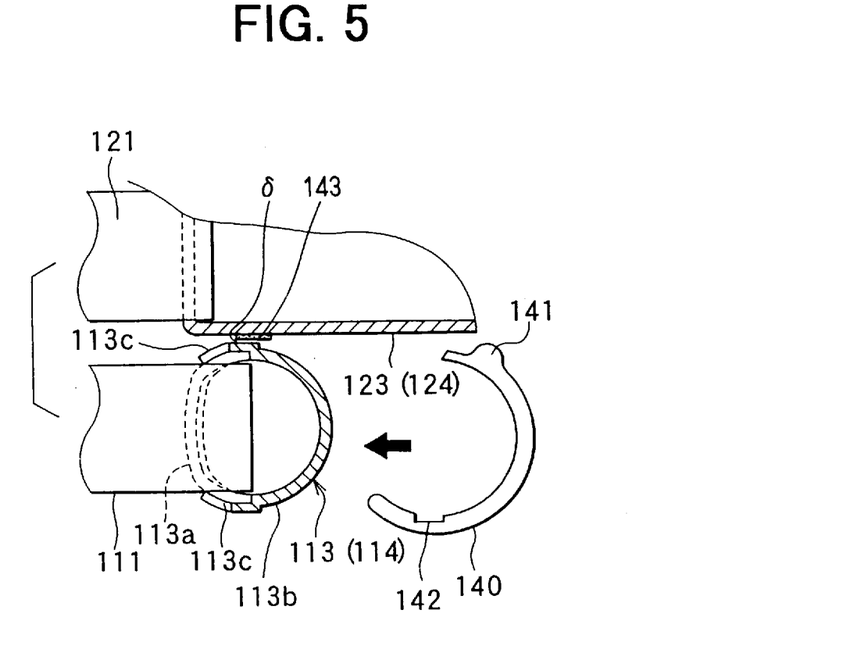
FIG. 5 and 5A are sectional views showing the header tanks of the double heat exchanger when a bracket is detached, according to the first embodiment.
Figure 5A:
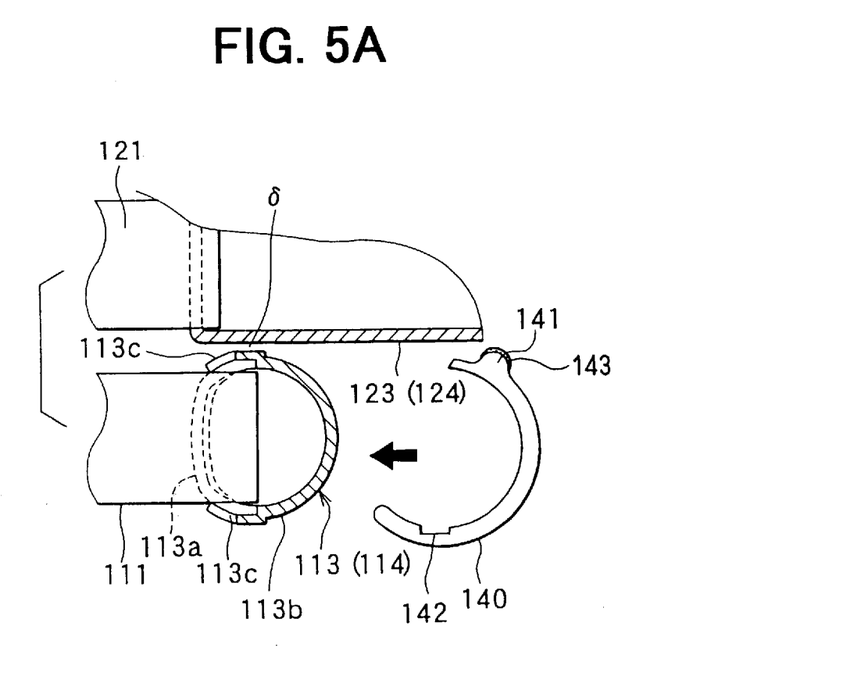

As shown, in FIGS. 4 and 5, at least one of the condenser header tanks 113 and 114 is constructed by a core plate 113a connected to the condenser tubes 111, and a tank plate 113b. The core plate 113a and the tank plate 113b are connected to define a tank refrigerant passage through which refrigerant flows. Protrusion portions 113c for provisionally fastening the tank plate 113b and the core plate 113a are provided in the core plate 113a and the tank plate 113b. The protrusion portions 113c of the tank plate 113b are plastically deformed so that the core plate 113a and the tank plate 113b are provisionally fastened.

A circular arc bracket 140 having an approximately semicircle protrusion 141 is attached to the condenser header tank 113 (114) in such a manner that the protrusion 141 partially connects both the header tanks 113 (114) and 123 (124) at positions shifted from a minimum clearance position where a clearance δ between both the header tanks 113 (114) and 123 (124) becomes minimum while the minimum clearance δ between both the header tanks 113 (114) and 123 (124) is maintained at a predetermined dimension. In the first embodiment, the minimum clearance position corresponds to the protrusions 113c.

In the first embodiment, dimensions of the bracket 140 and the protrusion 141 are set so that the clearance δ between both the header tanks 113 (114) and 123 (124) is set in a range of 0.5 mm–1.5 mm. Therefore, the moving of the melted brazing material due to the capillary, phenomenon can be readily restricted. In the present invention, when the clearance δ is set in a range of 0.6 mm–1.3 mm, the clearance effect can be further improved. The bracket 140 is made of a clad material in which an aluminum core material is coated with a brazing material.

In the first embodiment, in a contact end part of the protrusion 141 which contacts the radiator header tank 123 (124), magnesium is added to be used as a coating-removing restriction material for restricting the removal of an oxidation coating formed on a surface of the brazing material. Accordingly, brazing performance between the contact end part of the protrusion 141 and a contact surface of the radiator header tank 123 (124) is reduced. The contact end part of the protrusion 141 or the contact surface of radiator header tank 123 (124) can be made of an aluminum alloy including magnesium. Further, a paste-like magnesium material 143 can be applied to the contact end part of the protrusion 141 or the contact surface of radiator header tank 123 (124).

As shown in FIG. 5, a recess portion 142 is provided in the bracket 140 to be engaged with the protrusion portion 113c of the condenser header tank 113 (114). The protrusion portion 113c of the condenser header tank 113 (114) is engaged with the recess portion 142 of the bracket 140, so that the bracket 140 having the protrusion 141 is provisionally fixed to the condenser header tank 113 (114).

The inventors of the present invention found that a collection flow of melted brazing material from the protrusion 141 to a contact portion between the protrusion 141 and the radiator header tank 123 (124) due to a capillary phenomenon can be restricted, when the clearance δ around the protrusion 141 between the header tanks 113 (114) and 123 (124) is set to a range of 0.5 mm–1.5 mm when the above-described brazing method (NB method) is used.

Accordingly, when the clearance δ between the header tanks 113 (114) and 123 (124) is set in the range of 0.5 mm–1.5 mm, it can prevent heat-transmission from the radiator header tanks 123 (124) to the condenser header tanks 113 (114) from increasing due to the capillary phenomenon after brazing. As a result, a decrease of heat-radiating performance of the condenser 110 is sufficiently prevented.

Further, in the brazing method, magnesium for restricting the removal of the oxidation coating of the brazing material is added to the contact end part of the protrusion 141 or to the contact surface of the radiator header tank 123 (124). Therefore, it can further prevent the brazing material from flowing from the protrusion 141 to the contact end part contacting the radiator header tank 123 (124), and the decrease of the heat-radiating capacity of the condenser 110 is further prevented.

As shown in FIGS. 4, 5, the position corresponding to the protrusion portion 113c among the header tanks 113 (114) and 123 (124) is the minimum clearance position where the clearance δ between both the header tanks 113 (114) and 123 (124) becomes minimum. Because the protrusion portion 113c is provided in the minimum clearance position, it is difficult to integrally form the protrusion 141 with any one of the header tanks 113 (114) and 123 (124) for maintaining the minimum clearance δ between both the header tanks 113 (114) and 123 (124) at a predetermined clearance.

At the other non-protrusion position where the protrusion portion 113c is not formed in the condenser header tank 113 (114), the clearance δ between both the header tanks 113 (114) and 123 (124) is relatively large, and the protrusion dimension of the protrusion 141 for contacting the radiator header tank 123 (124) may exceed a plastic working limit when the protrusion 141 is formed in the condenser header tank 113 (114). Therefore, at the other non-protrusion position of the condenser header tank 113 (114), it is difficult to integrally form the protrusion 141 contacting the radiator header tank 123 (124).

Figure 6:
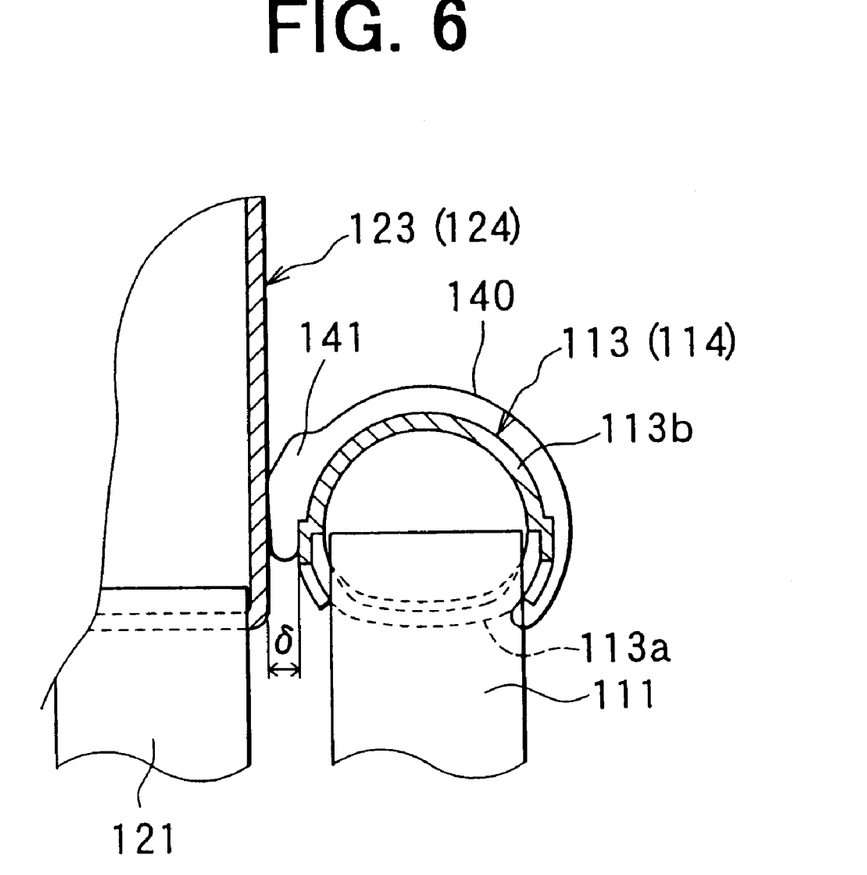
FIG. 6 is a sectional view showing header tanks of a double heat exchanger according to a modification of the first embodiment.

However, according to the embodiment of the present invention, because the protrusion 141 is provided by the bracket 140 separated from the header tanks 113, 114, 123 and 124, the protrusion 141 can be readily formed at any position without considering the plastic working limit. For example, as shown in FIG. 6, the protrusion 141 can be provided at a position corresponding to the protrusion portion 113c. Further, the shape of the bracket 140 having the protrusion 141 may be arbitrarily changed.

Figure 7A:
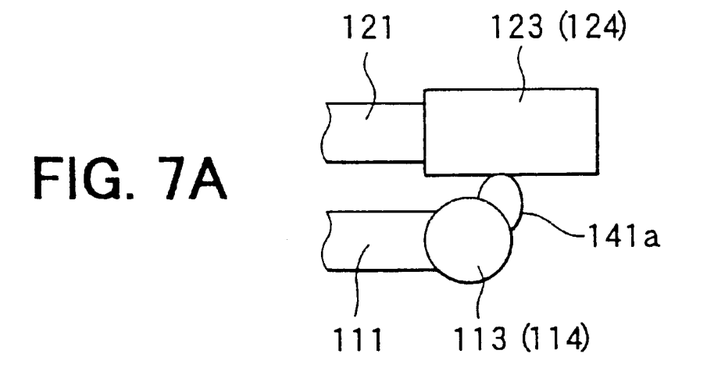
FIGS. 7A, 7B and 7C are schematic views each showing header tanks of a double heat exchanger, according to a second preferred embodiment of the present invention.
Figure 7B:
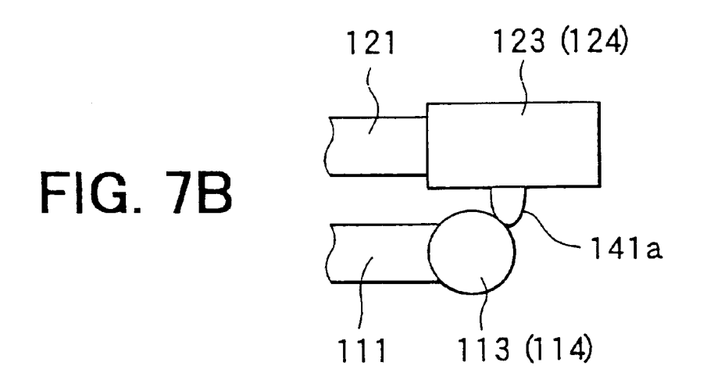
Figure 7C:
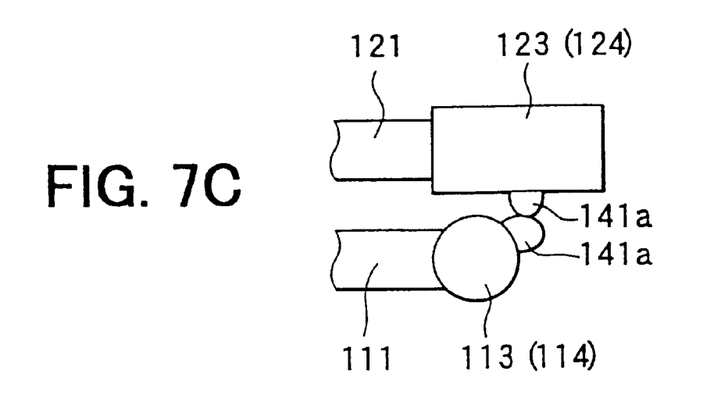

A second preferred embodiment of the present invention will be now described with reference to FIGS. 7A, 7B, 7C. In the above-described first embodiment, the protrusion 141 is formed by the bracket 140 separated from the condenser header tanks 113, 114. However, in the second embodiment, a protrusion 141a for partially connecting both the header tanks 113 (114) and 123 (124) and for holding the clearance δ between both the header tanks 113 (114) and 123 (124) at a predetermined dimension is integrally formed with at least one of the header tanks 113 (114) and 123 (124), as shown in FIGS. 7A–7C. Even in this case, the clearance δ around the protrusion 141a between both the header tanks 113 (114) and 123 (124) is set in the range of 0.5 mm–1.5 mm, and magnesium is added to be used as the coating-removing restriction material for the protrusion 141a. Further, magnesium can be added only in the contact end part of the protrusion 141a, contacting the header tank 113, 114, 123 and 124. Accordingly, in the second embodiment, the same effect as the above-described first embodiment can be obtained.

Although the present invention has been fully described in connection with the preferred embodiments thereof with reference to the accompanying drawings, it is to be noted that various changes and modifications will become apparent to those skilled in t he art.

For example, in the above-described embodiments, magnesium is added to the protrusion 141, 141a. However, magnesium may be added to a contact part of the header tank 113, 114, 123 and 124, contacting the protrusion 141, 141a.

Such changes and modifications are to be understood as being within the scope of the present invention as defined by the appended claims.

What is claimed is:

1. A double heat exchanger comprising:
   a first core for performing heat exchange between a first fluid and air flowing through said first core in an air-flowing direction, said first core having a plurality of first tubes through which the first fluid flows;
   a first header tank disposed at a longitudinal end of said first tubes to communicate with said first tubes;
   a second core for performing heat exchange between a second fluid and air flowing through said second core in said air-flowing direction, said second core having a plurality of second tubes through which the second fluid flows, said second core being disposed behind said first core in said air-flowing direction;
   a second header tank disposed at a longitudinal end of said second tubes to communicate with said second tubes;
   a first protrusion provided on said first header tank, said first protrusion having a contact part contacting a contact surface of said second header tank; and,
   magnesium for restricting removal of an oxidation coating being provided at one of said contact part of said first protrusion and said contact surface of said second header tank.

2. The double heat exchanger according to claim 1, wherein said one of said contact part of said first protrusion and said contact surface of said second header tank is made of an aluminum alloy including said magnesium.

3. The double heat exchanger according to claim 1, wherein said magnesium comprises a magnesium containing material applied to said one of said contact part of said first protrusion and said contact surface of said second header tank.

4. The double heat exchanger according to claim 1, wherein said first protrusion is disposed on a bracket attached to said first header tank.

5. The double heat exchanger according to claim 4, wherein said bracket has an engagement member through which said bracket is attached to said first header tank.

6. The double heat exchanger according to claim 1, wherein said first protrusion is formed integrally with said first header tank.

7. The double heat exchanger according to claim 1, wherein said first protrusion on said first header tank is bonded to said second header tank by brazing.

8. The double heat exchanger according to claim 1, wherein said first protrusion is disposed to form a clearance between said first header tank and said second header tank, and the clearance is in a range of 0.5 mm to 1.5 mm.

9. The double heat exchanger according to claim 8, further comprising a second protrusion provided on said second header tank to form the clearance between said first header tank and said second header tank.

10. The double heat exchanger according to claim 8, wherein the clearance is in a range of 0.6 mm–1.3 mm.

11. A double heat exchanger comprising:
    a first core for performing heat exchange between a first fluid and air flowing through said first core in an air-flowing direction, said first core having a plurality of first tubes through which the first fluid flows;
    a first header tank disposed at a longitudinal end of said first tubes to communicate with said first tubes;

a second core for performing heat exchange between a second fluid and air flowing through said second core in said air-flowing direction, said second core having a plurality of second tubes through which the second fluid flows, said second core being behind said first core in the air-flowing direction;

a second header tank disposed at a longitudinal end of said second tubes to communicate with said second tubes; and a protrusion provided on said first header tank, said protrusion having a contact part contacting a contact surface of said second header tank, wherein the protrusion is disposed to form a clearance between said first header tank and said second header tank, and the clearance is in a range of 0.5 mm to 1.5 mm; and said protrusion is disposed on a bracket attached to said first header tank.

12. The double heat exchanger according to claim 11, wherein said protrusion on said first header tank is bonded to said second header tank by brazing.

13. The double heat exchanger according to claim 11, wherein said bracket has an engagement member through which said bracket is attached to said first header tank.

14. The double heat exchanger according to claim 11, wherein said protrusion is formed integrally with said first header tank.

15. A double heat exchanger comprising:

a first core for performing heat exchange between a first fluid and air flowing through said first core in an air-flowing direction, said first core having a plurality of first tubes through which the first fluid flows;

a first header tank disposed at a longitudinal end of said first tubes to communicate with said first tubes;

a second core for performing heat exchange between a second fluid and air flowing through said second core in said air-flowing direction, said second core having a plurality of second tubes through which the second fluid flows, said second core being disposed behind said first core in said air-flowing direction;

a second header tank disposed at a longitudinal end of said second tubes to communicate with said second tubes;

a protrusion provided on one of said first header tank and said second header tank, said protrusion having a contact part contacting a contact surface of the other of said first header tank and said second header tank; and, magnesium for restricting removal of an oxidation coating being provided at one of said contact part of said protrusion and said contact surface of said other of said first header tank and said second header tank.

* * * * *